Jan. 23, 1923.
W. SANDERSON.
BRAKE.
FILED NOV. 6, 1918.
1,443,093
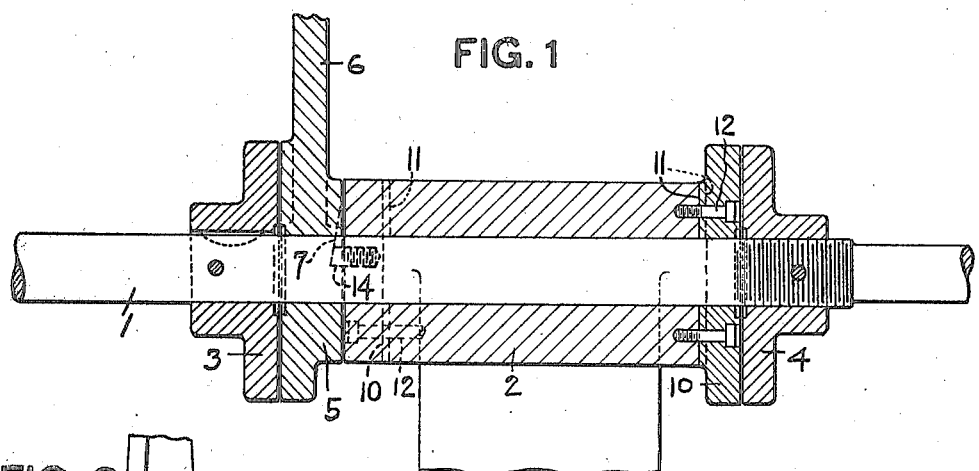
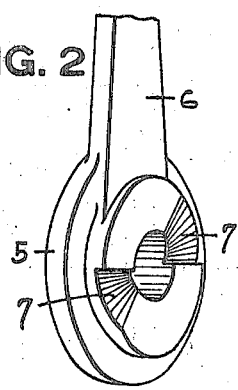
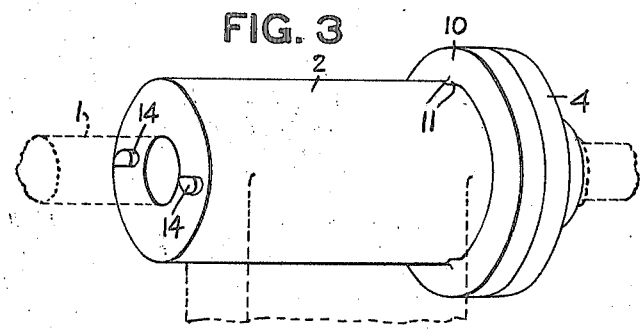
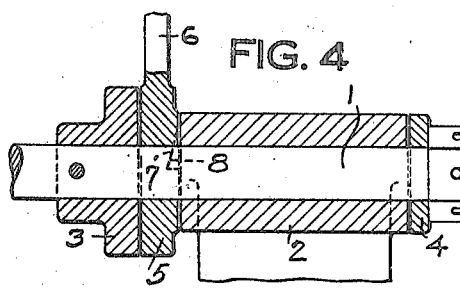
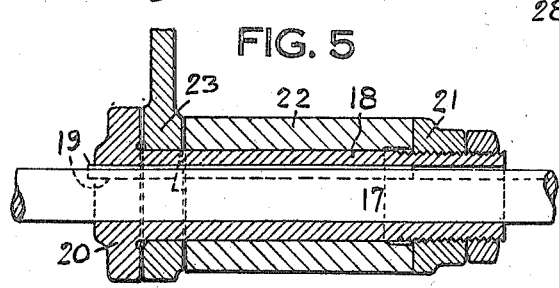
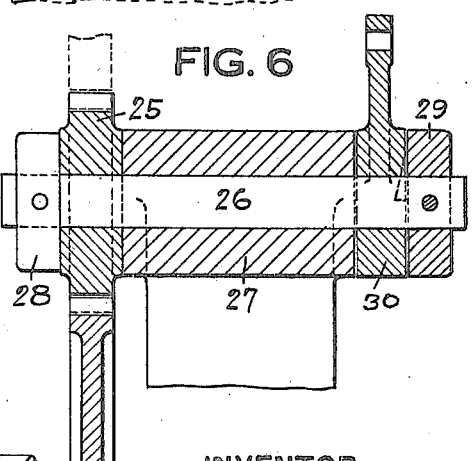
INVENTOR
William Sanderson
By Kny John Powell
atty Patented Jan. 23, 1923.

1,443,093

UNITED STATES PATENT OFFICE.

WILLIAM SANDERSON, OF CONNEAUTVILLE, PENNSYLVANIA, ASSIGNOR TO SIMPLEX MANUFACTURING COMPANY, OF CONNEAUTVILLE, PENNSYLVANIA, A CORPORATION OF DELAWARE.

BRAKE.

Application filed November 6, 1918. Serial No. 261,388.

*To all whom it may concern:*

Be it known that I, WILLIAM SANDERSON, a citizen of the United States, and resident of Conneautville, in the county of Crawford and State of Pennsylvania, have invented a new and useful Improvement in Brakes; and I do hereby declare the following to be a full, clear, and exact description thereof.

My invention relates to brakes, its object being to provide a simple, efficient and cheap form of brake applicable with little expense to a great number of shaft bearings, wheels, and the like. It comprises, generally stated, a non-rotating or stationary bearing, a rotating member, such as a shaft or wheel, abutments, and wedging means between an abutment and the bearing,—for example, a disc having a wedging connection between it and the bearing, so that by the simple rotation of the disc, friction may be created between the abutments and the bearing and the rotation of the shaft be retarded or stopped. It also comprises other improvements, as hereinafter particularly set forth and claimed.

In the accompanying drawing, Fig. 1 is a longitudinal section of a shaft having the invention applied thereto; Fig. 2 is a perspective view of a preferred form of the wedging disc; Fig. 3 is a perspective view of the bearing showing the shaft in dotted lines and partly broken away; Fig. 4 is a sectional view of a simplified form of the invention; Fig. 5 is a like view showing the invention as applied to a shaft passing through a sleeve so as to avoid end thrust on the shaft; and Fig. 6 is another modification of the invention.

My invention is applicable to any shaft or wheel bearings, and will be described, for example, in connection with the shaft 1 mounted in the stationary or non-rotating bearing 2, the shaft carrying the collars 3 and 4, rigidly secured thereto, and the wedging disc 5 fitting between the bearing 2 and a collar 3, the wedging disc 5 having the operating lever or handle 6. Between the wedging disc and the bearing is any suitable wedging means that illustrated being the wedging faces 7 on the wedge disc 5, while the bearing has like wedging faces 8 formed on the end face thereof. This is one very simple form of the invention and is illustrated in Fig. 4. It will thus be seen that the shaft carries two collars rotating with it and held against longitudinal movement and forming abutments, and that until the brake is applied the shaft is free to rotate with its collars 4 and 3 against the non-rotating bearing 2 and against the wedging disc 5. In these operations it can be lubricated as usual. To check the rotation of the shaft or stop its rotation, it is only necessary to swing the wedging or braking disc 6 so that its wedging faces contact with the wedging faces of the non-rotating bearing, which forces the face of the disc 5 against the collar 3 and draws the collar 4 against the opposite side of the bearing, so creating such strong wedging action that but little power is required to check or stop the rotation of the rotating shaft. The wedge faces of the braking disc or its corresponding bearing can, of course, have the form of depressed wedge faces of one or the other member and, as illustrated in Fig. 4, during the free or ordinary rotation of the shaft, no greater space is occupied than the thickness of the braking disc. Thus, by the simple addition of the wedging disc to the ordinary bearing, a powerful braking means is provided.

In the form of the invention illustrated in Fig. 1, I may employ removable friction or wedging faces, for example, as indicated in dotted lines the wedge face 10 on the bearing 2, which may have a tongue and groove connection 11 with said bearing to resist rotation, and may be secured thereto by bolts 12, the same used on one or both ends of the bearing. The wedging face may be formed as inclined depressions in the face of the disc, and by studs 14 secured on the face of the bearing and seating in said depressions. If all end thrust of the braking apparatus is to be avoided, I may also employ the construction illustrated in Fig. 5, in which the power driven shaft 17 carries what might be termed a sleeve shaft 18 connected thereto by a key and key-way 19 passing through the bearing and the wedging disc 23 and having the abutments 20 and 21 at each end thereof. The bearing 22 and the wedging disc 23 illustrated in said figure are enlarged to receive such sleeve shaft which rotates within them. Thus, the braking power may be applied while relieving the main driving shaft entirely from end thrust.

In Fig. 6 is illustrated the application of the invention to rotating wheels, for example, the wheel 25, which can be rotated by any suitable means, belting or gearing, the wheel being mounted on the non-rotating shaft 26 supported in the bearing 27 and having abutments 28 and 29. The wedging disc 30 is shown between the bearing and the abutment 29, and by drawing on the shaft, forces the abutment against the rotating wheel 25, and that wheel against the bearing 27 to give the braking action.

Another feature of the invention which should be kept in mind is that the preferable direction of rotation of the shaft to which the brake is to be applied is in the direction opposite to the braking action of the braking disc 6. Where the brake is applied under such conditions, while but little power is required to apply it, the natural rotation of the shaft prevents any possible jamming or grabbing of the brake, and the slightest reverse movement of the braking disc 6 relieves the shaft from braking strain.

The invention is applicable to many different uses, for example, in motor shafts, clutches, wheels, and in fact to any rotating element mounted in bearings, providing a very simple, cheap and compact braking means which tests have shown to be extremely efficient. The term "shaft" as used in the claims includes any such rotating member.

What I claim is:—

1. In a brake, the combination of a non-rotating bearing, a rotatable shaft extending therethrough, abutments secured to the said shaft on opposite sides of the said bearing, one of said abutments being adapted to rest flat against one end of said bearing, and a wedging disc surrounding the said shaft between the other abutments and the said bearing, the said disc having inclined wedging faces engaging with the said bearing.

2. In a brake, the combination of a non-rotating bearing having a wedging face, a rotatable shaft extending through the said bearing, abutments secured to the said shaft on opposite sides of the said bearing, one of said abutments being adapted to rest flat against one end of said bearing, and wedging means between the other abutments and the said bearing.

3. In a brake, the combination of a non-rotating bearing having a removable end bearing face, a shaft in the bearing, abutments on the shaft, one of said abutments being adapted to rest flat against one end of said bearing, and wedging means mounted on the shaft between the other abutment and the bearing and contacting with said removable end face of the bearing.

4. In a brake, the combination of a non-rotating bearing having on one face a removable wedging disc, a shaft in the bearing, abutments on the shaft, and a wedging means mounted on the shaft between an abutment and said removable wedging face of the bearing.

5. In a brake, the combination of a non-rotating bearing having on one face a removable wedging disc and on the other face a removable concentric disc, a shaft in the bearing, abutments on the shaft, one of said abutments being adapted to rest flat against one end of said bearing, and a wedging means mounted on the shaft between the other abutment and said removable wedging face of the bearing.

6. In a brake, the combination of a non-rotating bearing having the wedging face 8 at one end thereof, a shaft in the bearing, abutments on said shaft, and the braking disc 5 mounted on the shaft between an abutment and the wedge face of the bearing, said wedging disc having the wedging face 7 thereon.

7. In a brake, the combination of a non-rotating bearing, a rotatable shaft therein, abutments on the shaft on opposite sides of the said bearing, and a wedging disc between the bearing and an abutment, the wedge face of one member being sunken into that member for the reception of a projecting wedging face on the other member.

8. In a brake, the combination of a non-rotating bearing, a rotating shaft extending therethrough, abutments on said shaft, a wedging disc placed between the bearing and an abutment and having wedging faces disposed to come into wedging action in the opposite direction to the rotation of the shaft.

9. In a brake, the combination of an elongated tubular bearing, a shaft extending rotatably through said bearing, a removable wedging disc secured to one end of said bearing, a removable concentric disc of larger diameter than said bearing and secured to the other end thereof, an abutment secured to said shaft adjacent to said concentric disk, a second abutment carried by said shaft and spaced from the other end of said bearing, a wedging member surrounding said shaft between said last-named abutment, and the said wedging disc carried by said bearing, and a handle for turning said wedging member.

In testimony whereof, I the said WILLIAM SANDERSON, have hereunto set my hand.

WILLIAM SANDERSON.

Witnesses:
A. E. CLANEY,
JAMES FRANC.